US 6,627,282 B2

(12) United States Patent
Hammer et al.

(10) Patent No.: US 6,627,282 B2
(45) Date of Patent: *Sep. 30, 2003

(54) INTERNALLY COATED FOOD CASINGS BASED ON REGENERATED CELLULOSE

(75) Inventors: Klaus-Dieter Hammer, Mainz (DE); Leo Mans, Mainz (DE); Gerhard Grolig, Moerfelden-Walldorf (DE)

(73) Assignee: Kalle Nalo GmbH & Co. KG, Wiesbaden (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,804

(22) Filed: Sep. 25, 1998

(65) Prior Publication Data

US 2001/0048986 A1 Dec. 6, 2001

(30) Foreign Application Priority Data

Sep. 26, 1997 (DE) .......................................... 197 42 719

(51) Int. Cl.⁷ .......................... B29D 22/00; B29D 23/00; A22C 13/00; B05D 7/22
(52) U.S. Cl. ................ 428/36.92; 428/36.9; 428/36.91; 428/34.8; 428/35.6; 427/181
(58) Field of Search ............................... 428/34.8, 36.9, 428/421, 422, 36.91, 36.92, 35.2, 35.6; 427/181

(56) References Cited

U.S. PATENT DOCUMENTS

| | | | |
|---|---|---|---|
| 3,369,911 A | 2/1968 | Witzleben et al. | 99/176 |
| 3,794,515 A | 2/1974 | Turbak et al. | 117/145 |
| 3,886,979 A | 6/1975 | Rasmussen | 138/118.1 |
| 4,026,985 A | 5/1977 | Rasmussen | 264/129 |

(List continued on next page.)

FOREIGN PATENT DOCUMENTS

| | | |
|---|---|---|
| DE | 1 917 365 | 8/1970 |
| DE | 1 302 384 | 10/1970 |
| DE | 23 38 418 | 2/1974 |
| DE | 25 12 994 | 10/1976 |
| DE | 29 06 118 | 8/1980 |
| DE | 29 33 108 A | 2/1981 |
| DE | 29 33 131 A | 2/1981 |
| DE | 29 35 080 A | 3/1981 |
| DE | 30 12 250 | 2/1982 |
| DE | 34 16 406 | 11/1984 |
| DE | 33 28 050 A | 2/1985 |
| EP | 0 224 060 A | 6/1987 |
| EP | 0 457 178 | 11/1991 |
| FR | 2 305 290 A | 10/1976 |
| FR | 2 305 291 A | 10/1976 |
| GB | 814 760 A | 6/1959 |
| JP | 63-112820 A | * 5/1988 |

OTHER PUBLICATIONS

Fred W. Billmeyer, Jr.; Textbook of Poly Science; third edition, 305–306 and 345–346.*
Derwent Abstract of JP 63–112820 A; Teijin Ltd; Magnetic Recording Medium May 1988.*

Primary Examiner—Harold Pyon
Assistant Examiner—Michael C. Miggins
(74) Attorney, Agent, or Firm—Foley & Lardner

(57) ABSTRACT

A tubular food casing based on regenerated cellulose, which casing may be fiber-reinforced, is coated on its inner surface with a copolymer which includes 50 to 84% by weight of vinylidene chloride units, 2 to 20% by weight of acrylonitrile units, 1 to 10% by weight of acrylic acid units, and 1 to 47% by weight of ($C_1$–$C_{18}$)alkyl (meth)acrylate units. The casing has high water vapor barrier and oxygen barrier characteristics. The shirring folds and lay-flat edges which result during the production and processing of the casing remain undamaged over long storage periods. The inner coating, in addition, shows no hot-water haze on simmering. The casing is particularly suitable as an artificial sausage casing.

25 Claims, 1 Drawing Sheet

U.S. PATENT DOCUMENTS

| | | | |
|---|---|---|---|
| 4,233,341 A | 11/1980 | Hammer et al. | 427/230 |
| 4,248,912 A | 2/1981 | Gerigk et al. | 427/230 |
| 4,267,094 A | 5/1981 | Huhn et al. | 260/29.6 |
| 4,287,217 A * | 9/1981 | Hammer | 426/105 |
| 4,357,371 A | 11/1982 | Heinrich et al. | 427/238 |
| 4,546,023 A | 10/1985 | Kastl et al. | 428/36 |
| 4,741,938 A | 5/1988 | Kastl et al. | 428/36 |
| 5,316,809 A | 5/1994 | Hammer et al. | 428/348 |

* cited by examiner

INTERNALLY COATED FOOD CASINGS BASED ON REGENERATED CELLULOSE

BACKGROUND OF THE INVENTION

1. Field of the Invention

The invention relates to a tubular food casing based on regenerated cellulose having a coating on its inner surface, and to processes for its production and use. The casing is particularly suitable as an artificial sausage casing.

2. Description of Related Art

Fiber-reinforced food casings based on regenerated cellulose having a poly(vinylidene chloride) (PVDC) coating applied to the outside or inside are known. Coating the outside is technically simpler to accomplish. In contrast, the internally coated casings offer advantages in later processing. This is because, after filling with sausage emulsion, they can release water without impairment and thus shrink. The sausage thus constantly retains a full shape. It is also possible to use an externally coated casing, but this requires more complex equipment. This process has therefore not been able to establish itself.

One problem with the PVDC coating is that the softener (glycerol) is dissolved out of the cellulose hydrate casing by the coating dispersion and accumulates in the dispersion. On laying flat and also shirring of the casing, the coating is extremely mechanically stressed. The coating is thus frequently permanently damaged at edges and folds formed during this.

A dispersion suitable for the internal coating of cellulose hydrate casings, which dispersion comprises as essential constituent a copolymer having a content of vinylidene chloride (VDC) units of 86 to 92% by weight is disclosed in DE-B 25 12 994. Using this dispersion, a coating may be produced which already substantially possesses the required properties with respect to extensibility and strength. These properties of the coating change only slightly during storage. At a VDC content of 86 to 92% in the copolymer, the optimum film properties are only achieved at a very high molecular weight, however. Suitable copolymers are therefore only those whose 1% strength by weight solution in tetrahydrofuran (THF) has a relative viscosity $\eta_{rel}$ of greater than 3.0.

During a mean storage time of about 8 to 10 days until shirring, the film attains its final structure and thus sufficient strength, so that the shirring folds are not damaged, even during any desired period of storage of the shirred sticks. The film then does not change any more during further storage. The lay-flat edges which are impressed in the still-warm film on leaving the machine are, in contrast, damaged to a certain extent during storage. They are inevitably impressed into the film too early, as a result of which the film is deformed. On further storage, the deformation increases up to intense damage at this point, which increases correspondingly during extension of the soaked casings.

The high molecular weight required for these copolymers can only be achieved by a slow polymerization with cooling. However, these conditions lead to monodisperse dispersions. Internal coatings thus produced become hazy on heating in water, as is customary on simmering of sausages. Relatively large pores first form in which glycerol is included. The glycerol is then dissolved out from the outside, through the fibrous casing. The remaining cavities appear as haze after drying. This hot-water haze gives the appearance of an unwanted fat deposit on the sausages.

A tubular casing of regenerated cellulose having a gas- and moisture-impermeable barrier layer on the inside or outside is described in DE-B 23 38 418 (U.S. Pat. Nos. 3,886,979 and 4,026,985). The barrier layer, at 0° C., has an extensibility of at least 4%. The barrier layer can be produced from a vinylidene chloride copolymer, polyethylene or another polyolefin, polyester, polyamide, polyurethane or a combination thereof. There are no further details on the VDC copolymer.

DE-B 29 06 118 (U.S. Pat. No. 4,267,094) relates to a polymer blend from which hot-sealable layers having good resistance to blocking and good surface slip may be produced on cellulose hydrate fibrous casings. The blend consists of a component containing VDC copolymer and a polymeric anchoring component containing functional groups, which component comprises units of unsaturated carboxamido-N-methylol derivatives.

An artificial casing based on regenerated cellulose support material which has an inner coat of PVDC, polyolefin or nitrocellulose is disclosed in DE-B 13 02 384 (U.S. Pat. No. 3,369,911). An adhesive intermediate layer is also mentioned. However, more detailed information on the PVDC is absent.

Fiber-reinforced and non-fiber-reinforced cellulose hydrate casings having a moisture-and air-impermeable coating are also described in DE-B 19 17 365 (U.S. Pat. No. 3,794,515). The coating is produced by application of a solution of a VDC homopolymer or VDC copolymer, a polyisocyanate or polyester having free isocyanate groups, a reaction product of a polyol with ethylene oxide, propylene oxide or butylene oxide in a low-boiling ether, ester or ketone, drying the layer thus produced and subsequent hardening by heating.

A cellulose hydrate casing having a chlorine-free polyacrylate coating is also disclosed in EP-A 0 457 178 (U.S. Pat. No. 5,316,809) which, due to the ready fusion of the dispersed particles, always forms a haze-free film (without glycerol inclusions). From a certain molecular weight, the shirring folds and edges are not damaged during storage. Increasing the coating weight, moreover, compensates for the poorer water vapor barrier, so that in the case of simmering sausage, the loss in weight is no higher than with a PVDC-coated fibrous casing. However, an adequate oxygen barrier cannot be achieved by this means. Liver sausages discolor on the surface at the latest after 2 to 3 weeks by oxidation; a storage life of at least 6 weeks is required, however. In any event, an advantage of the chlorine-free, internally coated fibrous casings is that they are biodegradable and compostable, and they can be burned without releasing dioxin, even at temperatures below 600° C.

As the VDC content in the copolymer increases, the barrier properties (water vapor permeability, oxygen permeability and aroma permeability) of the coatings produced therewith improve; however, faults which are caused by the complicated bond between cellulose hydrate and PVDC also increase. The improved properties of the coating are therefore not reflected in the quality level of the internally coated sausage casings, but rather decrease it. Thus coating faults and the damage of shirring folds and edges at a high VDC content are increasingly more difficult to avoid.

In the case of the VDC copolymers according to DE-B 25 12 994 (U.S. Pat. No. 4,233,341) which have a high VDC content (86 to 92% by weight of VDC), damage to the shirring folds is prevented by a correspondingly high molecular weight (relative viscosity: greater than 3.0), because shirring is not carried out until completion of structure formation (crystallization). However, in the case of the lay-flat edges, this crystallization process cannot be waited for. The lay-flat edges are always impressed too early into the still-warm film, as a result of which the film is deformed. The deformation increases during storage and leads, on extension, to visible fault areas on the sausage.

A further crucial drawback is variable hot-water haze on scalding, which is caused by monodispersity. The high molecular weight required for the desired properties at this high VDC content is only achieved by slow polymerization with cooling, which inevitably leads to monodispersity.

However, haze and faults are also dependent on the base material. The higher its permeability, the more readily, and the greater the degree, to which glycerol is taken up and removed from the polymer film which forms (from the inner surface). In addition, the higher its permeability, the better the film melts, so that the damage to edges or shirring folds decreases.

SUMMARY OF THE INVENTION

An object of the invention was therefore to develop PVDC copolymers which may be used to produce an inner coating which remains haze-free and strong and supple enough so that shirring folds and lay-flat edges are not damaged during any desired storage period. A quality level is to be achieved, as is otherwise achievable only by an outer coating having two layers one on top of the other. For an internal coating, this complicated compromise in properties with a copolymer is therefore sought, since on the inside, clearly, only a single coating is possible.

It is also an object to develop a copolymer whose film structure is independent of the particle size distribution. In particular, it should melt better than the types having a high VDC content. The coating produced therewith is, in addition, immediately after leaving the coating machine, to have sufficient strength and toughness so that the lay-flat edges are not damaged during storage. Hitherto, this was only possible using a coating based on $(C_1-C_{20})$alkyl-(meth)acrylate copolymers, as described in EP-A 457 178. Edges and shirring folds of the casings thus coated are undamaged after any desired storage periods and the coating remains haze-free on scalding. A disadvantage of a coating using (meth)acrylate copolymers, however, is its relatively strong tendency to blocking, despite the high molecular weight (relative viscosity: greater than 3.0). It is also an object to produce an internally coated fibrous casing that has a high water vapor barrier (weight loss of 1 kg of meat sausage in a caliber-60 casing: less than 1% per week) and a high oxygen barrier (no discoloration of calf's liver sausage after a storage time of 6 weeks). In addition, it is desired that the shirring folds and lay-flat edges remain undamaged with any desired storage period and that the inner coating does not show hot-water haze on scalding.

Surprisingly, it has been found that the objects can be achieved by a tubular food casing based on regenerated cellulose having an internally coated surface, wherein the coating comprises at least one copolymer having 50 to 84% by weight of vinylidene chloride units, 2 to 20% by weight of acrylonitrile units, 1 to 10% by weight of acrylic acid units and 1 to 47% by weight of $(C_1-C_{18})$alkyl (meth) acrylate units.

In accordance with the invention there is also provided a process for producing the food casing, which comprises applying an aqueous dispersion of the copolymer to the inner surface of a tubular casing based on regenerated cellulose, which casing is optionally fiber-reinforced, and subsequently drying the casing.

In accordance with the invention, there is also provided a copolymer having 50 to 84%, by weight of vinylidene chloride units, 2 to 20% by weight of acrylonitrile units, 1 to 10% by weight of acrylic acid units, and 1 to 47% by weight of $(C_1-C_{18})$alkyl (meth)acrylate units, based on the total weight of the copolymer.

Further objects, features, and advantages of the invention will become apparent from the detailed description that follows.

DETAILED DESCRIPTION OF PREFERRED EMBODIMENTS

Figure 1:
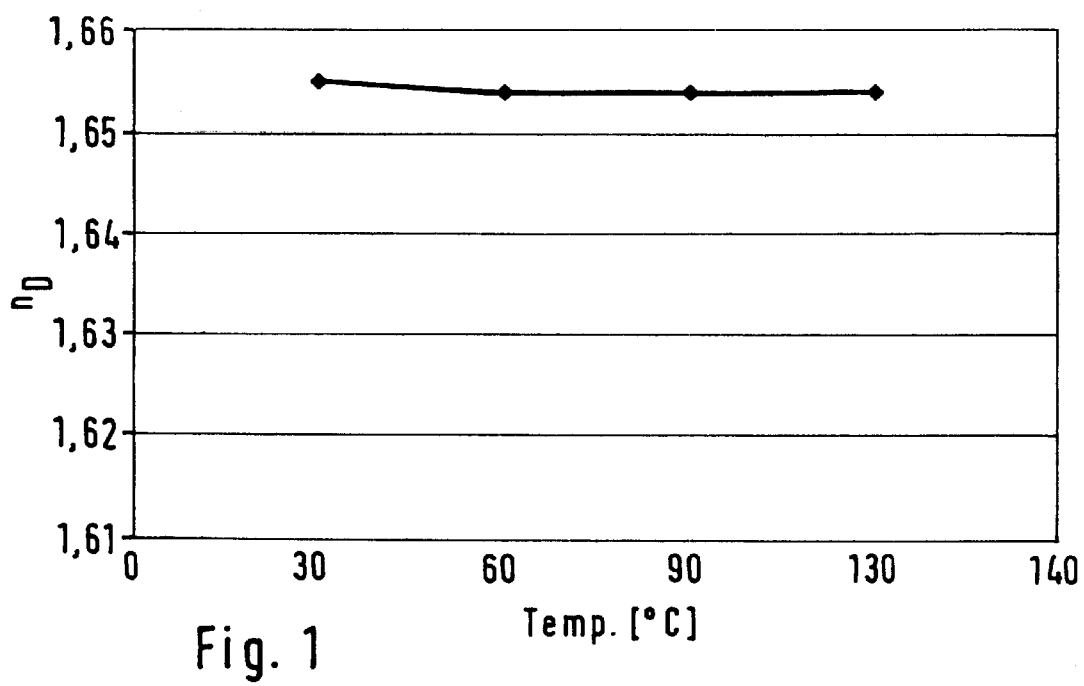
FIG. 1 shows the refractive index of a film of a copolymer useful in the invention.

Any copolymer having the above described units can be used in the present invention. Preference is given to a copolymer which comprises 60 to 75% by weight of vinylidene chloride units, 3 to 10% by weight of acrylonitrile units, 2 to 8% by weight of acrylic acid units, and 8 to 27% by weight of $(C_1-C_{18})$alkyl (meth)acrylate units. The $(C_1-C_{18})$alkyl group in said ester is preferably unbranched and particularly preferably has no more than six carbon atoms. Those which may be mentioned in particular are methyl, ethyl, propyl, butyl, pentyl and hexyl.

Particular preference is given to a copolymer which comprises 68 to 72% by weight of vinylidene chloride units, 5 to 7% by weight of acrylonitrile units, 2 to 4% by weight of acrylic acid units and 17 to 25% by weight of ethyl (meth)acrylate units. "(Meth)acrylic acid" or "(meth) acrylates" in this context means "acrylic acid and/or methacrylic acid" or "acrylates and/or methacrylates", respectively.

Processes to make the copolymer are known to those skilled in the art. Particularly suitable are radically induced emulsion polymerisation processes in aqueous media.

Generally, the content of copolymer or copolymer mixture of the inner coating is at least 70% by weight, preferably at least 90% by weight, based on the total weight of the layer. The remaining contents, if any, may be made up by waxes, plasticizers (generally glycerol), antifoamers, and other components customary for such inner coatings.

The molecular weight of the copolymer should be high enough so that its relative viscosity is about 2.0 to 3.5. For this purpose, the flow time of a 1% strength by weight solution of the copolymer in an organic solvent such as dimethylformamide (DMF) or dimethyl sulfoxide (DMSO), but preferably tetrahydrofuran (THF), is determined at a set temperature (generally 20° C). The relative viscosity is calculated therefrom using the formula $$\eta_{rel.} = \frac{t_L \cdot S_L}{t_{LM} \cdot S_{LM}}$$

where t is the flow time of the solution (L) or of the pure solvent (LM) and S is the respective density. The higher the content of vinylidene chloride units, the higher the relative viscosity should be in order to prevent the crystallization or changes in properties of the inner coating.

The copolymers are further characterized by certain crystallization parameters. To determine these parameters, a cast film is first produced from the copolymer. For this, the dispersion is poured onto a glass plate and dried. The film is then taken off from the glass plate. Samples of the film are each kept for 30 min at a temperature of 30, 60, 90 or 130° C. After cooling, the refractive index of the film samples is measured with a conventional refractometer. Generally, the molecular weight is sufficient if the refractive indices of the samples kept at the various temperatures differ from one another by no more than 0.004 units, preferably no more than 0.002 units. Therefore, for example, a film whose lowest value of the refractive index is 1.652 and whose highest value is 1.656 would still be according to the invention.

FIG. 1 shows the refractive index $n_D$ of a film of a copolymer which consisted of 70% by weight of vinylidene chloride units, 5% by weight of acrylonitrile units, 2% by weight of acrylic acid units and 23% by weight of ethyl acrylate units. Samples of this film have each been kept for 30 min at the specified temperatures. The measurement curve shows that the refractive index and thus the degree of crystallization virtually do not change in the range from 30 to 130° C.

Figure 2:
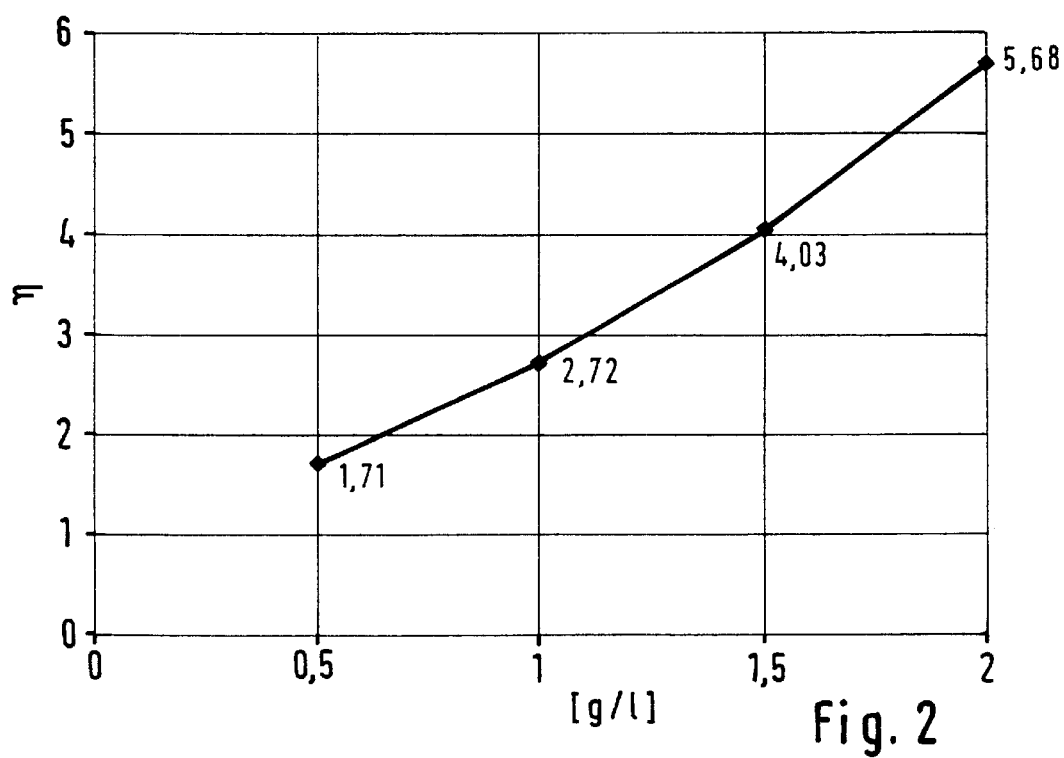
FIG. 2 shows the relative viscosity of a copolymer useful in the invention.

FIG. 2 shows the relative viscosity $\eta_{rel}$ of the copolymer from FIG. 1 as a function of concentration, determined on a 1% strength by weight solution in THF at 20° C.

The inner coating weight is generally 8 to 20 g/m², preferably 10 to 14 g/m². The water vapor permeability of the internally coated casings, determined in accordance with DIN 53122, is generally 4 to 20 g per square meter and per day, preferably 6 to 10 g/m² ·d. The inner coating forms a virtually defect-free continuous layer. The weight loss of 1 kg of scalded-emulsion sausage in a fiber-reinforced casing according to the invention of caliber 60 is, during storage in the cold room (7° C., 65% relative humidity) therefore generally no more than about 0.2 to 1.5% per week, usually no more than about 0.5 and 1.2% per week.

The oxygen permeability of the casing according to the invention is generally 4 to 25 cm³/m²·d·bar, determined in accordance with DIN 53380. It is sufficient to prevent discoloration on liver sausages reliably even for a storage period of 8 weeks.

Structure and quality of the inner coating are also influenced by the properties of the base material, i.e., of the tubular casing based on regenerated cellulose. A particularly suitable base material for the purposes of the present invention is one having a relatively high water permeability (=water permeation). Accordingly, the water permeation of the casing prior to the inner coating, at an internal pressure of 40 bar, should generally be between 85 and 125 l/m²·d, preferably between 90 and 115 l/m²·d. The permeation values are principally a function of the structure of the outer, and thus first precipitated, areas of the viscose layer. The precipitation liquid must then diffuse through the regenerated cellulose membrane thus formed, in order also to effect the regeneration in the lower lying areas of the viscose layer.

The permeation can be influenced, for example, by additions to the viscose solution or by variation of the precipitation conditions. This is achieved particularly simply by adding weak organic acids diluted in water to the viscose solution just upstream of the spinning nozzle, as described in DE-A 34 16 405, hereby incorporated by reference. In general, 1 to 3% strength by weight solutions of oxalic acid, acetic acid, formic acid, propionic acid, lactic acid, tartaric acid, or citric acid are used for this. In this manner, the permeation may be increased by 20 to 30% by the addition of a 1.5 to 2% strength by weight aqueous solution of formic acid or acetic acid.

The base material can also be dyed. For this purpose, the viscose solution used for its production is expediently mixed with dye or colored pigment. Any desired dye or pigment in effective amounts can be used.

The edges and folds which arise on laying flat and rolling up or shirring (compressed stick formation) the freshly produced casing of the invention, surprisingly, do not themselves lead to damage after a relatively long storage time. This is notable, since in the casings conventional hitherto, crystallization was completed neither in the cellulose hydrate nor in the inner coating when it was laid flat and rolled up or when it was shirred. The above-described copolymer, in contrast, rapidly attains its final structure and then, even at elevated temperature, does not crystallize any more. Furthermore, the inner coating, in the event of prolonged contact with hot water (i.e., under conditions as prevail during simmering of the sausage) does not become hazy. The casings according to the invention at the same time have very good mechanical properties. Those which may be mentioned are the high toughness, high strength, and particular suppleness. To date, it is considered to be inevitable that casings coated internally with PVDC, in particular internally coated fibrous casings, are damaged by the edges and folds arising during the production and processing. Likewise, it has been impossible hitherto to combine high toughness, strength and suppleness with freedom from haze.

The internally coated food casing according to the invention can be used to encase any desired food stuff, for example, in the production of various sausage types, for example simmering sausage and also liver sausage. Hitherto, different types of casings had to be used therefor.

The food casings according to the invention in addition show a surprisingly good hot-smoke permeability. However, for optimum smoke permeability, the content of vinylidene chloride units in the copolymer used for the inner coating should not exceed 70% by weight.

The present invention also relates to a process for producing the seamless, internally coated, tubular food casings. Any desired process can be used. In one process, an aqueous dispersion of the copolymer or a mixture of these copolymers is applied to the inner surface of the dried, tubular casing based on regenerated cellulose and is then dried.

A particularly suitable process for the inner coating and an apparatus therefor are described in DE-B 30 12 250 (U.S. Pat. No. 4,357,371), both herein incorporated by reference in their entirety. In this process, the dispersion is kept stationary in a loop of the tube, while the tube moves on. This process is generally known as slug-coating. The application rate may be set using a pair of pinch rolls. The aqueous dispersions used for coating advantageously have a solids content of between 50 and 55% by weight, based on their total weight. If the inner coating is carried out according to the process mentioned in DE-B 30 12 250, it has been found to be expedient to dilute the dispersions to a solids content of 16 to 30% by weight, preferably 18 to 25% by weight.

The dispersions may be stabilized still further by the addition of emulsifying aids. Particularly suitable auxiliaries are alkyl, aryl and alkylaryl sulfonates and sulfates. The content of these auxiliaries is generally up to 6% by weight, preferably 2 to 5 % by weight, based on the weight of the polymers to be dispersed. Expediently, the dispersion further contains small amounts of antifoamer, preferably silicone antifoamer. Minute amounts, such as 0.001 to 0.05 % by weight, based on the weight of the polymers to be dispersed, are generally sufficient. The addition of wax, preferably a natural wax, reliably prevents the inner coating from sticking together when the casing is laid flat. A wax content of up to 4%, for example 1 to 4% by weight, based on the weight of the copolymer, has proved to be expedient here. The coated casings can be dried, for example, in a drying tunnel which has, at its inlet, a temperature of 80° C., for example. The temperature increases slowly until it reaches 140° C., for example, at the end of the tunnel.

The dispersions can also contain glycerol as a softener, for example, in an amount up to 16% by weight, preferably from 4 to 10% by weight, based on the weight of the dispersion.

By prior impregnation of the cellulose surface with an adhesive, the adhesion of the inner coating can be further increased. Any desired adhesives can be used for this purpose. Condensation products of epichlorohydrin and a polyamine-polyamide, available e.g. as ®Kymene 526 from Hercules, are particularly highly suitable for the impregnation. Useful adhesives are also urea/melamine/formaldehyde resins or polyethylene imines. The main purpose of the adhesive is to adjust the surface tension of the cellulosic casing material to that of the inner coating. The application rate of the adhesive is generally 30 to 100 mg/m$^2$. The impregnation is customarily permeable to water and water vapor. The impregnation is customarily applied to the inner surface of the regenerated, washed and plasticized tube. The tube is then dried.

The casings may be non-fiber reinforced or fiber reinforced with any desired reinforcement. For example, fiber papers, particularly hemp fiber paper, are useful.

The examples below relate to preferred embodiments of the present invention, and are for illustration purposes only and do not limit the scope of the invention. Percentages therein are percent by weight, unless otherwise stated.

EXAMPLE 1

A tube having a diameter of 60 mm (=caliber 60) made of hemp fiber paper (weight of the paper: 17 g/m$^2$) is exposed to viscose solution on the inside and outside. The viscose solution was distributed in such a manner that 40% thereof was applied to the paper on the outside and 60% on the inside. After the conventional regeneration and washing, the gel tube thus obtained was plasticized using glycerol. Prior to entry into the drier, an anchoring solution (polyamine-polyamide-epichlorohydrin-precondensate) was charged into the gel tube. The tube was then dried in a hot-air drier in the inflated state between two pairs of pinch rolls, set ("conditioned") to a water content of 12% and wound up.

The inner coating was applied as in DE-B 30 12 250, hereby incorporated by reference in its entirety. For this purpose, sufficient aqueous coating dispersion was charged into a loop of a roughly 900 m-long tube which comprised

| | |
|---|---|
| 20% | copolymer of the composition specified below, |
| 1.5% | glycerol and |
| 0.5% | KPS wax (a mixture of esters of waxy acids having 24 to 34 carbon atoms, comprising in particular montanic acid esters), available from Clariant Deutschland GmbH. |

The dispersion was moved through the entire tube. The copolymer contained 70% units of vinylidene chloride, 5% units of acrylonitrile, 2% units of acrylic acid and 23% units of ethyl acrylate.

The relative viscosity of the 1% strength solution of the copolymer in THF was 2.72; the refractive index of the film was 1.653. It did not change between 30 and 120 20 C., i.e., the film rapidly achieved its final structure and thereafter did not crystallize further.

A coating weight of 12 to 14 g/m$^2$ was set via the roller gap of the pair of pinch rolls. The casing was dried in the inflated state. The surface temperature of the casing at the outlet of the drier was about 160° C.

After leaving the drier, the tube was moistened until the water content was 8 to 10%. It was then laid flat and wound up on a roll. The water vapor permeability of the coated tube was 8 g/m$^2$·d and the oxygen permeability was 15 cm$^3$/m$^2$·d.

After a roll storage time of 10 days at room temperature, the material was shirred to form shirred sticks; shirring folds and edges remained defect-free after any period of storage. For practical tests, the shirred sticks, after storage for six weeks under normal ambient conditions, were stored for one week, under tropical conditions (36° C, 85% RH) and were then filled with meat emulsion or liver sausage emulsion.

No fault areas (shirring folds, edges) were observed on either type of sausage, and the coating remained completely haze-free during sausage manufacture. The weight loss of the meat sausage (1 kg) reached 0.8% per week. The sausages remained full over a plurality of weeks. The liver sausage, even after cold-room storage for six weeks, was still not discolored, i.e., no oxidation occurred at the surface.

EXAMPLE 2

A double-viscosed, brown cellulose hydrate tube which had been manufactured conventionally, i.e., viscosed on the inside and outside (viscose distribution: 50% outside and 50% inside), of caliber 75 having a fiber reinforcement of hemp fiber paper (paper weight: 21 g/m$^2$) was first plasticized with glycerol. Before entry into the drier, the anchoring solution described in Example 1 was charged into the gel tube. The tube was then dried as usual in the inflated state, conditioned, and wound up.

The inner coating was produced as described in Example 1 using the same dispersion.

The coating weight was set at 13 to 15 g/m$^2$. After a storage period of two weeks, the material was shirred. Shirring folds and edges were fault-free after any period of storage. Meat sausage produced therewith lost 0.4% of its weight per week during storage in the cold room. Liver sausage remained without discoloration over 6 weeks. The coating was haze-free.

EXAMPLE 3

An uncolored cellulose hydrate tube of caliber 60 having a reinforcement of hemp fiber paper (as described in EXAMPLE 1) was coated with an aqueous dispersion which comprised

| | |
|---|---|
| 22% | of the copolymer defined in more detail below, |
| 2% | glycerol and |
| 0.5% | KPS wax. |

The copolymer consisted of 75% vinylidene chloride units, 5% acrylonitrile units, 1% acrylic acid units and 19% of ethyl acrylate units. The relative viscosity of a 1% strength solution of the copolymer in THF was 2.8.

At an inner coating weight of 12 g/m$^2$, a water vapor permeability of 6 g/m$^2$ ·d and an oxygen permeability of 12 cm$^3$/m$^2$·d were measured.

After 3 weeks, the material was shirred to form shirred sticks which did not show damaged shirring folds nor lay-flat edges after any storage period. The coating remained completely haze-free during sausage manufacture.

The weight loss of meat sausage (1 kg) on storage in the cold room, is 0.6% per week. After 6 weeks, liver sausage did not show any discoloration on the surface.

EXAMPLE 4

A brown-dyed tube of caliber 60 having a fibrous paper insert (paper weight 17 g/m$^2$) the permeation of which has been set at 120 l/m$^2$·d by metering a 2% strength aqueous formic acid solution into the viscose was spun as described in EXAMPLE 1, dried and internally coated with a dispersion consisting of

| | |
|---|---|
| 18% | of the copolymer defined in more detail below, |
| 3% | glycerol and |
| 0.3% | KPS wax. |

The copolymer consisted of 82% vinylidene chloride units, 6% acrylonitrile units, 2% acrylic acid units and 10% methylacrylate units. The relative viscosity of a 1% strength solution of this copolymer in THF was 2.9.

At an inner coating weight of 12 g/m$^2$, the water vapor permeability was 4 g/m$^2$·d and the oxygen permeability was 8 cm$^3$/m$^2$·d·bar.

After storage of the wound-up casing for one week in the tropical chamber, 85% of the lay-flat edges were still undamaged in the center of the roll.

The film was haze-free. Meat sausage (1 kg of sausage) lost 0.3% of its weight per week in the cold room. Liver sausage still showed no discoloration on the surface after storage for 8 weeks in the cold room.

EXAMPLE 5

A non-fiber-reinforced cellulose hydrate tube (caliber 45) conventionally manufactured was impregnated prior to drying with the anchoring solution described in EXAMPLE 1. The polyamine-polyamide-epichlorohydrin-condensation product used here was applied in this case at a rate of 65 mg/m$^2$. The tube was dried to a residual water content of 12%. It then had a swelling value of 150% and a water permeation of 70 l/m$^2$·d at a pressure of 40 bar.

The inner coating was applied as described in EXAMPLE 1. The same coating dispersion was used as in EXAMPLE 1 and the casing was dried in the inflated state at a final drier temperature of 155° C. The application rate was 10 g/m$^2$.

The water vapor permeability of the casing thus produced was 8.8 g/m$^2$·d at 23° C. and 85% relative humidity.

German Application 19742719.7 filed Sep. 26, 1997, the priority document of the present application, is hereby incorporated by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

We claim:

1. A tubular food casing made from regenerated cellulose, having a continuous coating on an internal surface thereof, wherein the coating comprises at least one copolymer having 50 to 75% by weight of vinylidene chloride units, 2 to 20% by weight of acrylonitrile units, 1 to 10% by weight of acrylic acid units, and 1 to 47% by weight of ($C_1$–$C_{18}$)alkyl (meth)acrylate units, based on the total weight of the copolymer.

2. A food casing as claimed in claim 1, wherein the copolymer comprises 60 to 75% by weight of vinylidene chloride units, 3 to 10% by weight of acrylonitrile units, 2 to 8% by weight of acrylic acid units, and 8 to 27% by weight of ($C_1$–$C_{18}$)alkyl (meth)-acrylate units.

3. A food casing as claimed in claim 1, wherein the copolymer comprises 68 to 72% by weight of vinylidene chloride units, 5 to 7% by weight of acrylonitrile units, 2 to 4% by weight of acrylic acid units, and 17 to 25% by weight of ethyl (meth)acrylate units.

4. A food casing as claimed in claim 1, wherein the copolymer has a relative viscosity η of 2 to 3.5.

5. A food casing as claimed in claim 1, wherein the weight of the coating is 8 to 20 g/m$^2$.

6. A food casing as claimed in claim 1, wherein the coating comprises at least 70% by weight of one or more of said copolymers, based on the total weight of the coating.

7. A food casing as claimed in claim 1, wherein the coating additionally comprises a wax.

8. A food casing as claimed in claim 1, which has an oxygen permeability of 4 to 25 cm$^3$/m$^2$·d·bar.

9. A food casing as claimed in claim 1, comprising between the casing and the coating an impregnation on the casing's inner surface of an agent which causes anchoring of the coating.

10. A food casing as claimed in claim 9, wherein the agent comprises a condensation product of epichlorohydrin and a polyamine polyamide.

11. A food casing as claimed in claim 1, which is fiber-reinforced.

12. A food casing as claimed in claim 1, having prior to application of the inner coating a water permeation of 85 to 125 l/m$^2$·d, at an internal pressure of 40 bar.

13. A food casing as claimed in claim 1, which is hot-smoke permeable.

14. A process for producing a food casing as claimed in claim 1, which comprises applying an aqueous dispersion of said copolymer to the inner surface of a tubular casing based on regenerated cellulose, which casing is optionally fiber-reinforced, and subsequently drying the casing.

15. A process as claimed in claim 14, wherein the dispersion has a solids content of 50 to 55%.

16. A process as claimed in claim 14, wherein the dispersion additionally comprises glycerol.

17. Food encased by a casing according to claim 1.

18. Sausage encased by a casing according to claim 1.

19. The tubular food casing according to claim 1, wherein said ($C_1$–$C_{18}$)alkyl group is unbranched.

20. The tubular food casing according to claim 19, wherein said unbranched alkyl group contains no more than six carbon atoms.

21. The tubular food casing according to claim 1, wherein said (meth)acrylate units are ($C_1$–$C_6$)alkyl (meth)acrylate units.

22. A tubular food casing, comprising a tubular base layer made from regenerated cellulose and having an internal surface and an external surface, the tubular base layer having a water-impermeable continuous coating on only its internal surface, wherein the water-impermeable coating comprises at least one copolymer having 50 to 75% by weight of vinylidene chloride units, 2 to 20% by weight of acrylonitrile units, 1 to 10% by weight of acrylic acid units, and 1 to 47% by weight of ($C_1$–$C_{18}$)alkyl (meth)acrylate units, based on the total weight of the copolymer.

23. A tubular food casing as claimed in claim 22, wherein the copolymer has a molecular weight and the water-impermeable coating has a thickness such that the tubular food casing has a water vapor permeability of 4 to 20 g/m$^2$·d.

24. A tubular food casing as claimed in claim 22, wherein the base layer is such that the casing, prior to application or the inner coating, has a water permeation of 85 to 125 l/m$^2 \cdot$d, at an internal pressure of 40 bar.

25. A tubular food casing according to claim 1, wherein said tubular food casing is a seamless tubular food casing.

* * * * *